Figure 1:
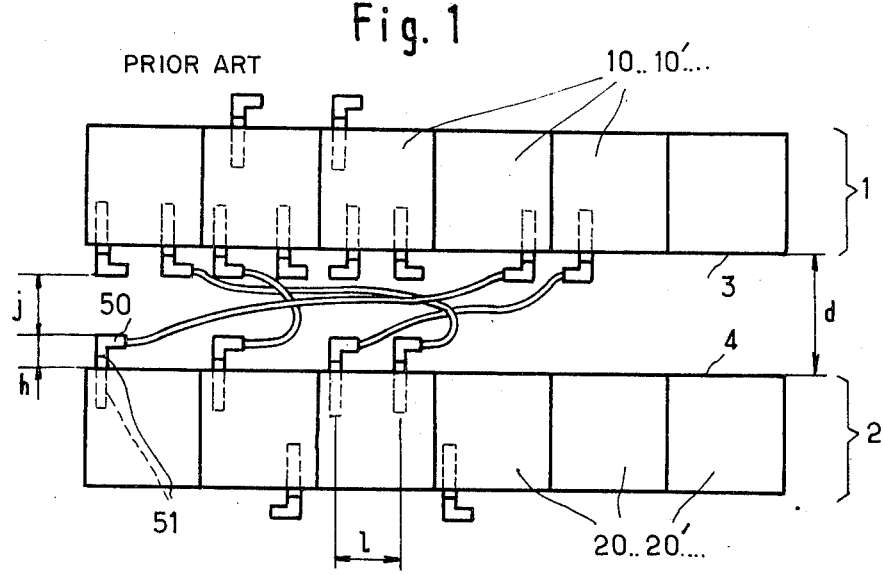

United States Patent [19]
Bouteille et al.

[11] 3,980,324
[45] Sept. 14, 1976

[54] SWIVELLING COUPLING FOR FLUID

[75] Inventors: Daniel Bouteille, Marnes la Coquette; Michel Nicolas, Plaisir, both of France

[73] Assignee: La Telemecanique Electrique, France

[22] Filed: Mar. 10, 1975

[21] Appl. No.: 556,837

[30] Foreign Application Priority Data
Mar. 21, 1974 France .............................. 74.09797

[52] U.S. Cl. .............................. 285/179; 137/271; 285/93; 285/137 R; 285/215; 285/281; 285/323

[51] Int. Cl.² .......................................... F16L 39/04

[58] Field of Search .............. 285/137 R, 179, 93, 285/119, 322, 323, 184, 215, 281; 137/271, 270

[56] References Cited
UNITED STATES PATENTS

| | | | |
|---|---|---|---|
| 925,762 | 6/1909 | Eager | 285/184 X |
| 1,117,251 | 11/1914 | Safberg | 285/179 |
| 2,366,809 | 1/1945 | Seemann | 285/179 X |
| 2,764,429 | 9/1956 | Betzler | 285/179 X |
| 3,145,035 | 8/1964 | Hanback | 285/179 X |
| 3,650,549 | 3/1972 | Pepper | 285/93 X |
| 3,653,689 | 4/1972 | Sapy et al. | 285/322 X |
| 3,844,586 | 10/1974 | Olen | 285/179 X |
| 3,888,518 | 6/1975 | Delessert | 137/271 X |

*Primary Examiner*—Thomas F. Callaghan
*Attorney, Agent, or Firm*—William Anthony Drucker

[57] ABSTRACT

This coupling comprises a rotary cylindrical portion which is recessed and an outlet opening whose lower edge is placed level with the lowest point of a surface which is inclined relative to the rotation axis, whereby the said surface is placed adjacent to the axis and the side opposite to the said opening.

This coupling is more particularly intended to be used on the inlets and outlets of pneumatic automatic control modules.

2 Claims, 6 Drawing Figures

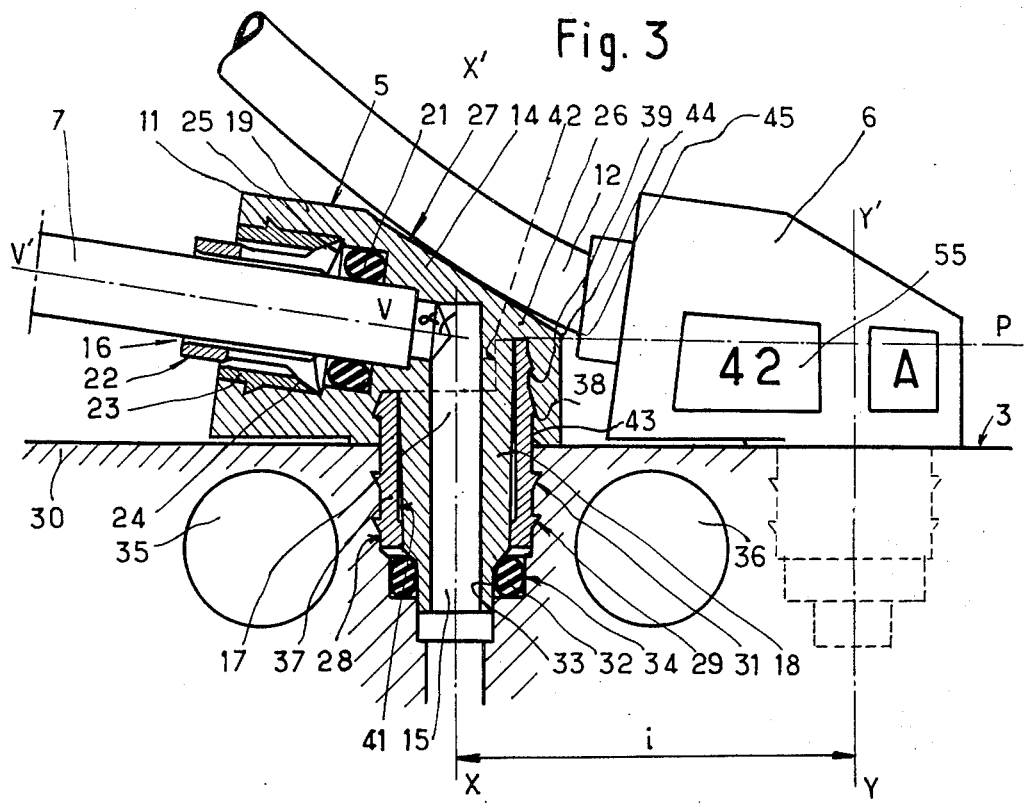
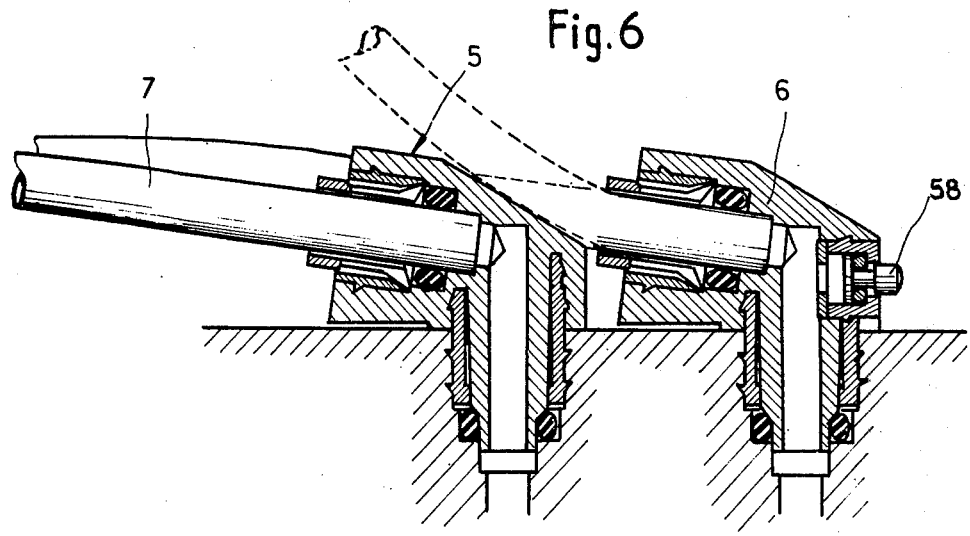

SWIVELLING COUPLING FOR FLUID

The invention relates to a swivelling coupling for fluid comprising a body whereof a cylindrical portion can pivot sealingly relative to the frame to which it is fixed and has a first substantially axial opening connected to a second opening of the body whose axis forms a particular angle with the rotation axis of the cylindrical portion and is shaped to receive a flexible tube.

Such couplings can be used in medium and low pressure equipment and are used more particularly in automatic pneumatic control systems for processes or installations.

Couplings of the type defined hereinbefore are already known but their use leads to certain constraints which make certain precautions necessary.

Firstly, these couplings are generally associated with a base which has to be screwed into the member receiving or supplying fluid. Therefore, this base must have a threaded portion and faces permitting the screwing into the particular member. Moreover, the said base has a cylindrical extension which co-operates with the coupling body in a rotary and sealing manner. Finally, this type of coupling is generally bent and has a lateral opening whose axis forms a right angle with the pivot axis.

As a result of this construction, the member receiving the coupling must have a threaded opening which is expensive to produce, the total height of the coupling is considerable due to the presence of the screwing faces and the base extension and two adjacent swivelling couplings respectively connected to their flexible tube must be separated by a large spacing so that they can pivot without their tube interfering with the nearest coupling.

Consequently, the systematic use of these couplings leads to the pneumatic equipment being prohibitively large and a considerable gap must be left when arranging the members in parallel rows if the couplings are placed on the surfaces of the said facing rows.

It is, in fact, possible to place these couplings on the front or rear surface of the members but in the first case it is then no longer possible to have on the front surface information relative to the nature or operation of the member which complicates maintenance of the tube system for the user whilst in the second case the rear surface of the members must be made accessible so that they have to be fitted within costly racks or the like or alternatively it becomes necessary to prohibit the use for other purposes of the space located behind the said members.

It is also pointed out that the shape hitherto adopted for such swivelling couplings makes it difficult to place or print information on each of them. This is due to the fact that on the one hand the surfaces limiting the couplings are generally cylindrical and on the other, the members do not have a preferred assembly position.

Therefore, the invention proposes to supply swivelling couplings whose construction and proportions make it possible to install them side by side with a spacing close to their maximum transverse dimension while significantly reducing their overall height in such a way that the association of modules in parallel rows can take place by observing a high filling coefficient for the available surfaces by reducing the dimensions of the passageway separating two adjacent rows.

The invention also aims at permitting the rotation of the couplings and their orientation in a random direction to facilitate the positioning of flexible tubes on the fixed couplings on the lateral surfaces of the modules from the forward area of the equipment, subsequently permitting their arrangement in the passageway separating two adjacent rows.

The invention finally proposes to provide a non-detachable swivelling coupling comprising simple members, whereby the shape of the outer surface is utilized for displaying information which is easy to read due to the position assumed by the coupling once it is installed.

According to the invention, this is achieved by means of a swivelling coupling, wherein at least that portion of the body diametrically opposed to the second opening relative to the rotation axis and the area adjacent to the said axis are limited by a surface which is inclined relative to the said axis, wherein the area of the said surface nearest the frame is substantially positioned in a plane perpendicular to the axis passing through the area of the second opening closest to the frame and wherein the cylindrical portion has on the one hand an outer surface having hooking means which penetrate the walls of a frame recess in such a way as to permit the rotation thereof whilst assuring its axial holding, whilst on the other hand a bearing of the portion co-operates with a sealing member placed therebetween and on the surface of the frame.

According to another characteristic of the invention, the cylindrical portion comprises a core of plastic material integral with the body, surrounded by a metal bush having a first series of frustum-shaped excrescences with sharp edges which constitute the hooking means.

According to another characteristic of the invention, the metal bush has a second series of frustum-shaped excrescences and edges parallel to the axis for making the bush axially and angularly integral with the body.

Other features of the invention can be gathered from the following description with reference to the drawings, wherein show:

FIG. 1 a front view of a prior art construction.

Figure 2:
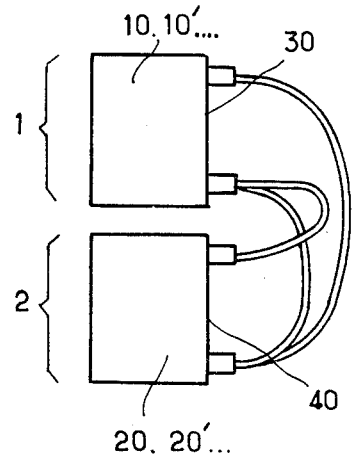

FIG. 2 a side view of another embodiment wherein the tubes are arranged on the front surfaces.

FIG. 3 in section one of two adjacent couplings.

Figure 4:
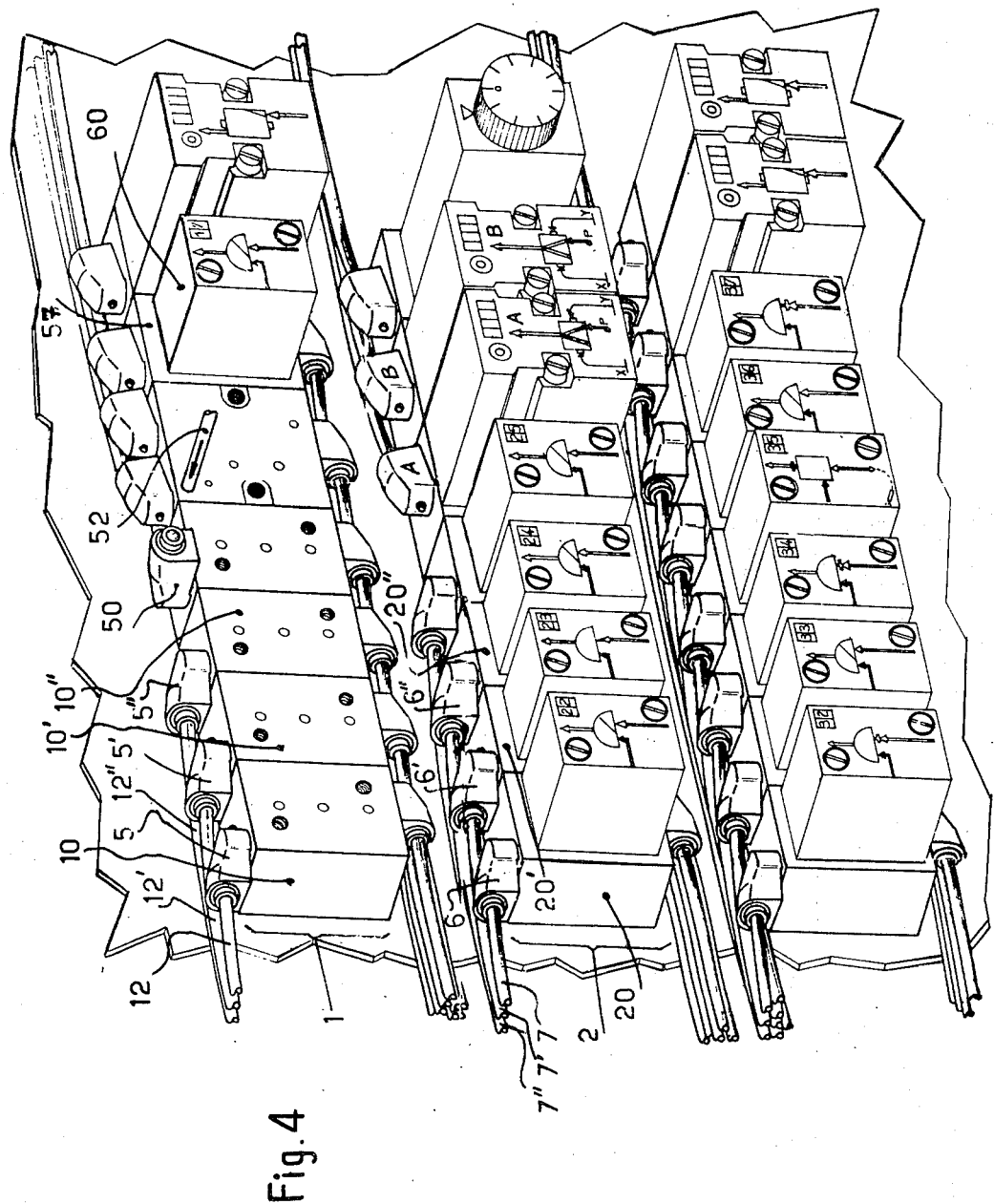

FIG. 4 a perspective view of a pneumatic control system using the couplings of FIG. 3.

Figure 5:
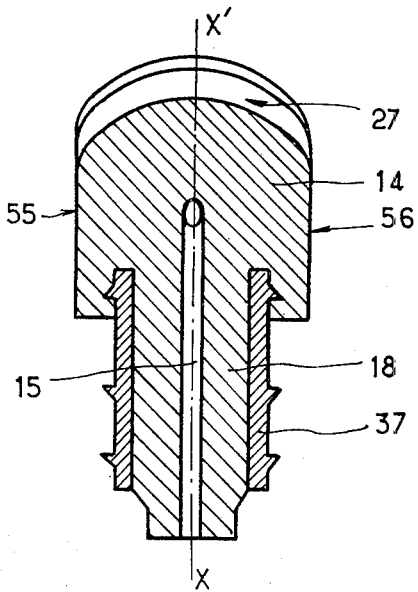

FIG. 5 a sectional view of the coupling along its rotation axis.

FIG. 6 a sectional view of a coupling equipped with a pressure gauge.

In pneumatic automatic control systems, modules 10, 10', 20, 20' are generally used which can more particularly perform logic functions, timing functions, interlocking, etc.

These modules are generally grouped together in parallel rows of a particular length, whereby the rows 1, 2 are separated either by a passageway $d$ if, as in the case of FIG. 1, the fluid inlets and outlets are provided on the lateral facing surfaces 3, 4 of the modules or by a technical gap for permitting the fitting thereof if, as shown in FIG. 2, the fluid inlets and outlets are provided on the front surface 30 or the rear surface 40.

As stated hereinbefore, these arrangements make it necessary to have either a very wide passageway or large overall dimensions of the modules or a difficult access.

If the system of passageways shown in FIG. 1 is adopted, it is necessary to use bent couplings of a particular height $h$ such as those designated by the reference numeral 50. Obviously, the passageway dimensions cannot be less than the distance $d$ equal to twice the value $h$ plus a tolerance $j$ permitting the installation of the coupling, which is generally fixed by means of a threaded base 51.

Thus the passageway width is directly influenced by the height $h$ of the bent couplings 50 and by the depth of base 51. Moreover, if it is necessary to place several couplings on each module, it is necessary to provide a certain spacing $l$ between the axes of two adjacent pivoting couplings so that the flexible tubes can overlap during the arrangment thereof in the passageways following a rotation of the couplings.

Thus, the dimensions of the modules and therefore their number in a row of given lengths are directly influenced by the rotation possibilities of the swivelling couplings.

FIG. 3 shows a bent swivelling coupling which as a result of its construction permits a considerable reduction in the width of the passageway and the dimensions of the modules.

This coupling 5 comprises a body 14 having two openings 15, 16 connected by a pipe 17, whereby the first opening 15 is made in a pivoting cylindrical portion 18 of the body whilst the second opening 16 issues into a lateral portion 19 whilst forming an angle of $\alpha$ with the pivot axis.

Opening 16 is equipped with a per se known rapid fixing system comprising a toroidal gasket 21, a clamp 22 for securing flexible tube 7 and a stop collar 23. The clamp and the collar have two conical bearings 24 and 25 respectively which co-operate to ensure a radial locking of the tube then, after the pressure is established, the latter is subjected to an axial force.

Portion 26 of body 14 which is diametrically opposite to the lateral opening 16 is limited by a surface 27 inclined relative to the rotation axis XX' of cylindrical portion 18.

Cylindrical portion 18 is fixed within a cylindrical opening 28 made in frame 30 part of a module in such a way that it can rotate relative thereto. To this end, frustum-shaped annular projection 29, 31 penetrate the material constituting the frame or a recess provided beforehand, whilst providing a frictional torque which does not prevent rotation but ensures axial holding.

A toroidal gasket 32 is arranged between two cylindrical bearings 33, 34 which belong respectively to the cylindrical portion and to the frame.

The recessing of the cylindrical portion which serves as the pivot makes it possible to use the adjacent areas 35, 36 of the module for other purposes such as internal passageways for the tubes and therefore considerably reduces the dimensions of the module body located above surface 3.

To obtain the full advantage of the space gain, it is preferable for the coupling to be permanently arranged in frame 30 of the module prior to installation.

This can be brought about by giving the frustum-shaped projections sharp edges and making them from a harder material than the frame.

The coupling body and cylindrical portion 18 could be made entirely of metal whilst the modules could be made from a plastic material. However, it is easier to make the couplings from plastic and provide the cylindrical portion 18 with a metal bush 37 which has projections.

As it is not easy to mould plastics on metals, particularly due to the expansion coefficients, bush 37 is axially anchored in annular recess 43 of the coupling body by means of a second series of frustum-shaped projections 38, 39.

The angular immobilisation of the bush on portion 18 can be obtained by an axial member 41 or by an edge 42 parallel to the axis XX' supported on a portion of body 14 provided to this end in the base of recess 43.

When a coupling such as 6 is arranged in the immediate vicinity, a centre-to-centre distance $i$ must be provided between axes XX' and YY' permitting the complete rotation thereof. However, this rotation is only possible if tube 12 associated with coupling 6 can pass above the adjacent coupling. It is therefore necessary to ensure that portion 44 of surface 27 closest to the frame is substantially located in the plane P perpendicular to axis XX' passing through point 45 of the lateral opening which is itself closest to the frame. It thus becomes possible to select a centre-to-centre distance $i$ which is substantially the same as the maximum transverse dimension of the coupling. When, for example, coupling 6 is pivoted, flexible tube 12 accompanying the same can slide on surface 27 and assume a position behind coupling 5. All the tubes can then be placed beneath the couplings provided that the tops 11 of the couplings arranged on two opposing surfaces 3, 4 are separated by a gap reduced to the value of the diameter of the flexible tubes, as can be seen in FIG. 4.

In a preferred embodiment, the angle $\alpha$ is less than 90° (close to 80°) and the oblique surface 27 is a cylindrical surface whose directrix is placed in a plane perpendicular to the axes of the openings and whose concavity is turned towards the said openings, as shown in FIG. 5 which shows a section along axis XX'.

For checking and testing purposes, a pressure gauge 58 can be placed on the coupling portion arranged between the oblique surface and the outer surface of the module (particularly FIG. 6). On one or both lateral surfaces 55, 56 shown in FIG. 5 it is possible to provide information concerning the operation of the tube or the function of the inlets and outlets. This gauge which substantially comprises a piston which sealingly slides in the coupling wall has an outwardly projecting end which, once the pressure has been established, is always visible in view of the orientation given to the couplings according to FIG. 4.

The couplings are placed on the modules prior to assembly and the penetration of the cylindrical portions into the module bodies is preferably performed with force by using tools whose shape is adapted to that of the couplings. When the modules are assembled in parallel rows, the couplings are arranged in such a way that their connecting openings are directed in the forward direction which facilitates the introduction of flexible tubes. The tubes are then turned down beneath the couplings by means of the passageways arranged between them.

FIG. 4 shows two parallel rows 1, 2 of juxtaposed pneumatic modules 10, 10' etc. or 20, 20' etc., whereby each of the modules is equipped with pivoting couplings 5, 5', 5'' etc. 6, 6', 6'' with which are associated flexible tubes 12, 12' etc. 7, 7'. It should be noted that despite the limited dimensions of the passageway separating two adjacent rows, it is possible to position all the tubes behind the couplings.

Even though the majority of the couplings is shown in their rest position in one of the directions, to the right or to the left, one of them referenced 50 is placed in a non-turned down position where it can easily receive the end of a flexible tube 52. Due to its construction, coupling 50 can in turn assume a position comparable to that of the adjacent couplings. This arrangement is particularly significant when each of the pneumatic modules comprises a fixed base 57 whereon is fixed a more elaborate pneumatic component 60.

FIG. 3 shows that the references or information carried by the couplings can then be very easily read. This information can either be affixed by hot printing in the plastic material or by printing with an inking pad.

It is easy to remove one of the tubes by using a clip or hook whereon a pulling force is exerted towards the front of the modules which leads to a sliding of the particular tube on the adjacent couplings and a rotation in the forward direction of the coupling associated with the selected tube.

Variants as regards the shape of the inclined surface 27, the hooking means 29, 31 or the rotary sealing means are possible without passing beyond the scope of the invention. Thus, the inclined surface can have two bends, elastic members such as annular springs can be used with reference to the hooking means and sealing members can be arranged between the surfaces of opening 15 or the end of the cylindrical portion and an appropriately shaped inner surface of body 30.

We claim:

1. A swivelling coupling for fluid comprising:
   i. a frame having a cylindrical recess therein opening at a surface
   ii. a coupling body including a cylindrical portion and a lateral portion, said cylindrical portion having a central axis and said lateral portion having a central axis, said body having an internal channel extending from a first opening provided in said cylindrical portion to a second opening provided in said lateral portion, said cylindrical portion being disposed in said recess, said cylindrical portion having annular projections engaging into said frame such that said cylindrical portion is rotatable in said frame recess but locked against axial withdrawal therefrom,
   iii. a toroidal resiliently compressible sealing member and an annular clamping means disposed in said channel in said lateral portion for sealingly securing a flexible tube therein, said coupling body having a first surface portion, a second surface portion contiguous with said first surface portion, and a third surface portion contiguous with said second surface portion, said first surface portion being parallel to said axis of said cylindrial portion and diametrically opposite to said second opening, said second surface portion being inclined relative to said axis of said cylindrical portion, said third surface portion being substantially parallel to said axis of said lateral portion, said first and second surface portions meeting along a common edge, that point of said second opening which lies closest to said frame surface being substantially in a plane normal to the axis of the cylindrical portion containing said common edge, said axis of said lateral portion being inclined by an angle 90°-minus-alpha with respect to a plane normal to said axis of said cylindrical portion, said second surface portion being inclined by an angle approximately twice 90°-minus-alpha with respect to said plane normal to said axis of said cylindrical portion.

2. A swivelling coupling, as claimed in claim 1, wherein said frame is made of plastics material, and wherein said cylindrical coupling portion includes an external metal bush on which said annular projections are provided, said bush having other annular projections engaging in said coupling body to lock said bush against axial movement, with respect to said body.

* * * * *